April 3, 1956    L. SCHMIEDEL    2,740,580
HORIZONTAL CENTRIFUGAL SEPARATOR
Filed April 24, 1951    2 Sheets-Sheet 1

Inventor:
Ludwig Schmiedel
by Watson Cole,
Grindle & Watson
Attorneys

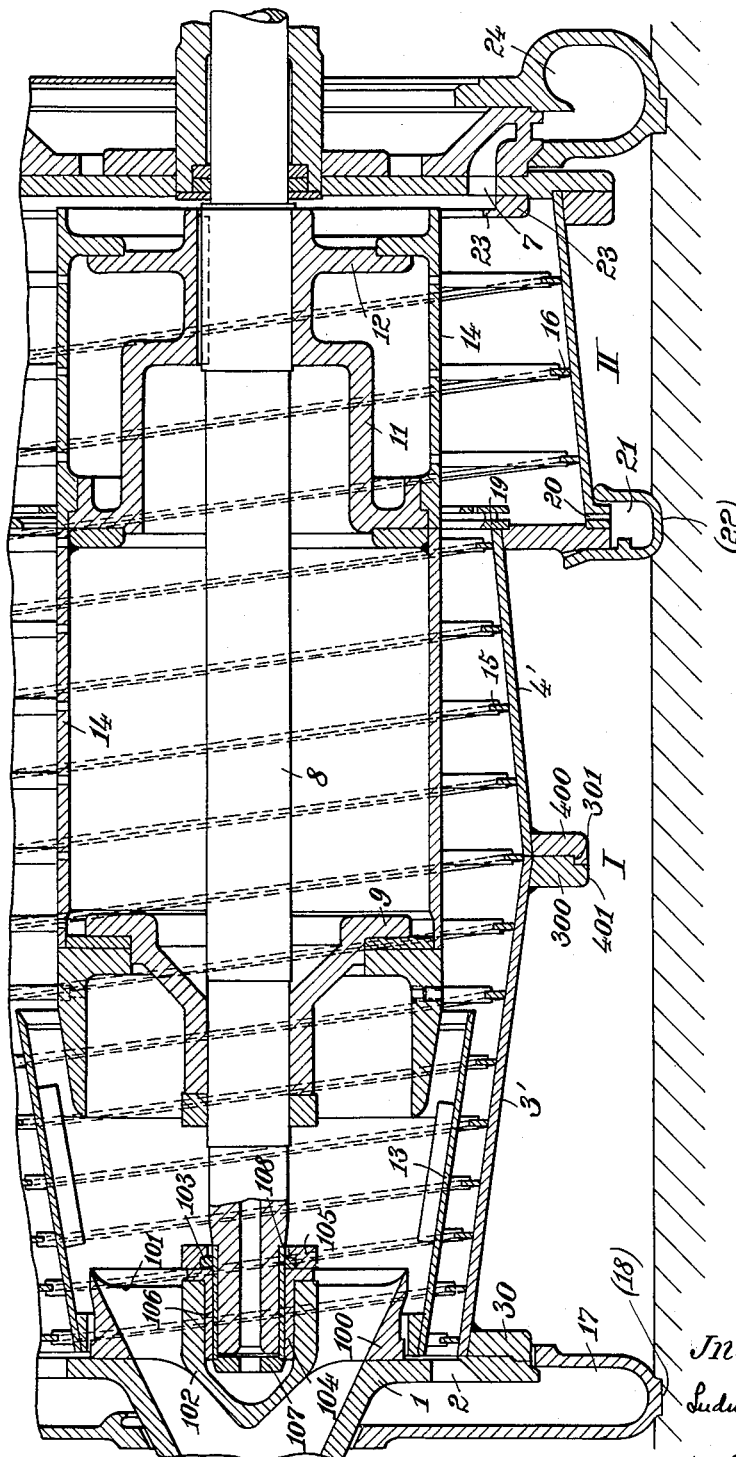

2,740,580
Patented Apr. 3, 1956

2,740,580

HORIZONTAL CENTRIFUGAL SEPARATOR

Ludwig Schmiedel, Leipzig, Germany, assignor to Starcosa Maschinen- und Apparatebau Gesellschaft mit beschränkter Haftung, Wunstorf, Hannover, Germany, a German company Application April 24, 1951, Serial No. 222,596

Claims priority, application Germany May 3, 1950

11 Claims. (Cl. 233—7)

My invention relates to a horizontal centrifugal separator serving the purpose of treating a mixture of solid and liquid matter and separating the same.

In such mixture the constituents often consist of various materials differing by the size, shape and specific weight of their particles. As a result, the rate at which such particles suspended in the liquid constituent will sink and settle will differ. By causing the mixture to flow in a certain direction and by permitting the solid matter to settle, the solid matter may be classified in accordance with its different constituents. In order to expedite such classification operation, horizontal centrifugal separators may be employed. In the separators known prior to the present invention, however, such fraction of the solid material as consists of the minutest particles will be left suspended in the liquid. In many cases, however, for instance in the manufacture of starch, such solid constituent left in the supporting liquid in a highly diluted condition must be removed for various reasons either because they are too valuable to be wasted or because their presence in the supporting liquid adversely affects the removal or use of such liquid.

It is the primary object of the present invention to afford a horizontal centrifugal separator serving the dual function of separating and recovering the primary solid constituents in a pure condition and of separately recovering such finely divided solid matter as will remain in the supporting liquid after the separation of the primary solid constituents.

Further objects of my invention will appear from the description following hereinafter of two preferred embodiments of my invention and the features of novelty will be pointed out in the claims.

In the drawings:

Fig. 2 is a similar section of another embodiment differing from that shown in Fig. 1 in certain details.

Figures 1, 3:
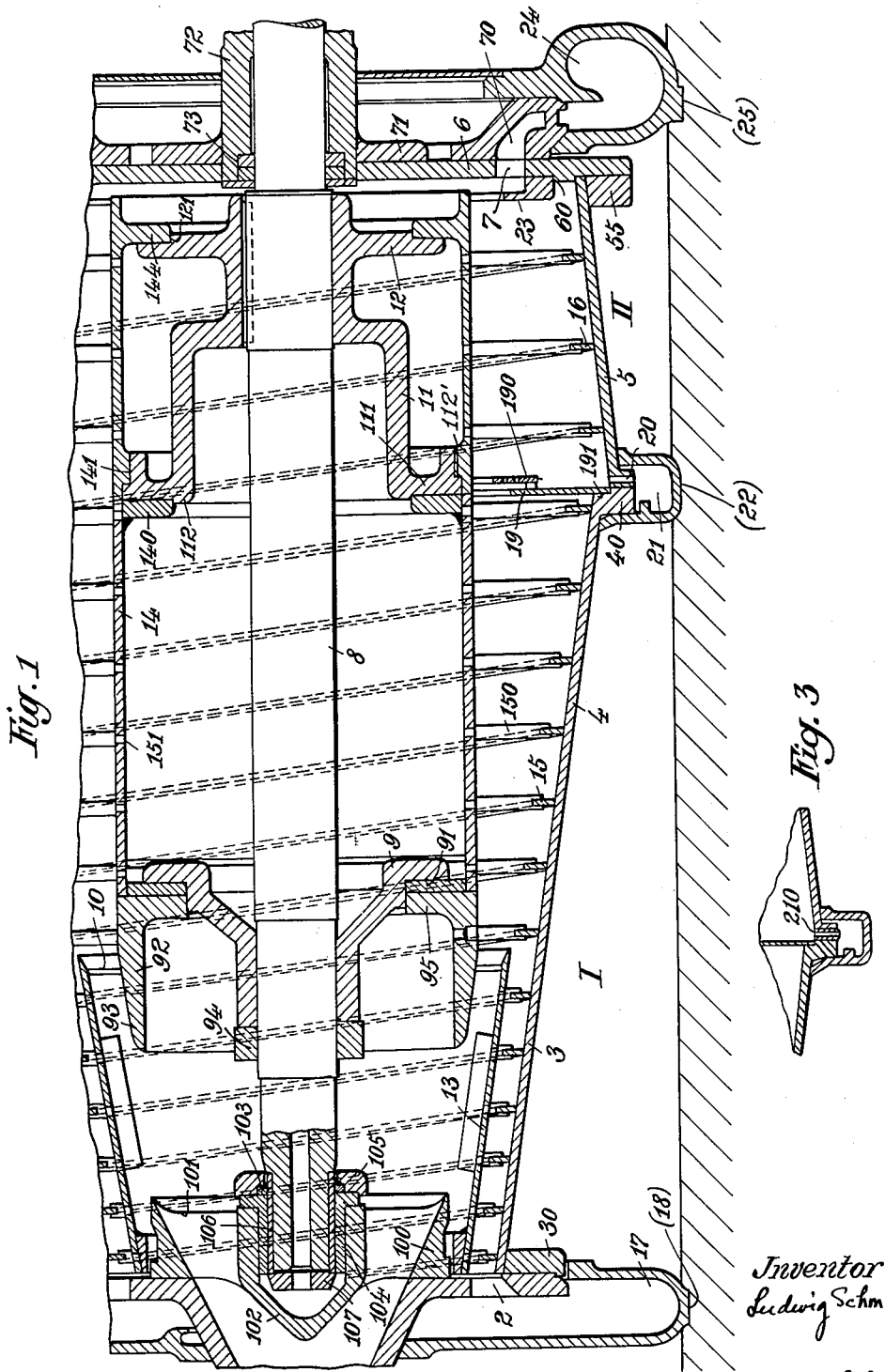
Fig. 1 is a vertical longitudinal partial section of a horizontal centrifugal separator embodying the present invention, the upper portion being omitted, an illustration thereof being deemed dispensable.
Fig. 3 is a partial section similar to that of Figs. 1 and 2 showing a modification of a detail shown in Figs. 1 and 2.

The novel horizontal centrifugal separator comprises substantially a rotary drum divided into a primary section I and a secondary section II. Adjacent to the inlet end of the rotary drum suitable inlet means are mounted to feed a mixture to be treated into the drum.

In the embodiment shown in Fig. 1 such inlet means comprise an end plate 1 suitably attached to a flange 30 of the drum and provided with a central opening confined by a conical portion communicating with a feed pipe not shown. On the internal face of the end wall 1 an annular member 100 is seated and suitably fixed, such member 100 extending the conical inlet duct into the interior of the drum and being provided with radial ribs 101 integral with a central head 102 in which the end of a shaft 8 mounted co-axially with the drum is journalled. Moreover, the end wall 1 is provided with apertures 2 adjacent to the periphery of the primary drum section I for the discharge of the solid deposits separated from the liquid.

Suitable means are co-ordinated to the inlet end of the drum to collect the solids discharged through the apertures 2. In the present embodiment such means comprises a stationary casing 17 having an annular end wall closely surrounding the flange 30 of the drum, the other end wall closely surrounding the conical portion of the end wall member 1, such casing 17 resting on a suitable support 18 and communicating with a discharge pipe not shown.

Adjacent to the outlet end of the drum provided with an end plate 6 a stationary collector 24, 25 is so mounted as to collect and discharge the liquid treated that issues from the outlet end of the drum. The end plate 6 is suitably attached to a flange 55 of the secondary drum section II and provided with a central hub 72 surrounding and supporting the shaft 8 and with a plurality of apertures 7 for the discharge of the liquid treated. A casting 71 is fixed to the hub 72 adjacent to the end plate 6 and provided with ducts 70 and with a peripheral rim in which discharge openings of the ducts 70 are provided. The collector 24 is substantially formed by an annular hollow casting having an internal peripheral slot straddling the peripheral rim of the casting 71 so that the liquid issuing from the ducts 70 will be collected by the casting 24. The latter rests on a suitable support 25 and communicates with a discharge pipe, not shown.

Suitable anti-friction bearings, not shown, serve to journal both the hub 72 and the conical portion of end wall 1 in suitable stationary brackets. Shaft 8 serves to carry a rotary feeder which is mounted within the drum for relative rotation substantially in contact with the inside thereof, such feeder serving to axially feed solid deposits separated from the liquid in a direction towards the inlet end of the drum. In the present embodiment, such feeder consists of a primary feeder section 15 and of a secondary feeder section 16, both sections being formed by a worm.

A suitable gearing, not shown, serves to so co-operatively connect the shaft 8 carrying the feeding worm or worms with the hub 72 carrying the rotary drum that both will revolve at slightly differing speeds when shaft 8 is driven by a suitable primary mover, not shown.

I shall now describe the manner in which shaft 8 is journalled within the head 102.

For this purpose a sealing ring 103 is interposed between a bushing 104 and a holding ring 105 secured in a suitable manner, for instance by screws, not shown. The reduced end of the hollow shaft 8 is provided with a lining 106 held in position by an annular member 107 and abutting against a shoulder 108 of shaft 8. The bushing 104 is secured against rotation within the head 102 by a suitable key.

For the purposes of the present invention, the rotary drum is provided with an annular internal weir 19 intermediate its ends, whereby the interior of the drum is subdivided into a primary section I and a secondary section II. The primary section I receives the liquid to be treated from the inlet duct formed by the members 1 and 101 and causes separation from the liquid of coarser solids, whereas the secondary drum section II receives the liquid to be treated that overflows the internal rim of weir 19 and serves to separate the finer solids therefrom. It will be understood that in operation the drum revolves at a speed causing the liquid fed thereto to form an annular body having a substantially cylindrical internal level, the radius of such level being determined in drum section I by the weir 19 and in drum section II by a weir 23 formed by an annular member attached to the end wall 6.

In the embodiment illustrated in Fig. 1 the drum section I tapers towards the inlet end thereof, the internal diameter of drum section I gradually and continuously increasing from the inlet end up to the annular weir 19. The weir 19 carries an annular disk 190 held in spaced relation thereto by suitable spacing means within the drum section II and serving the purpose of conducting the liquid overflowing weir 19 outwardly in radial direction.

In the embodiment shown the weir 19 is formed by an exchangeable member abutting against a shoulder 191 of an end flange 40 provided on the drum section I. The internal diameter of the drum section II is a maximum near the weir 19 exceeding the internal diameter of drum section I near the weir 19. While drum section I is formed by a conical sheet metal member 3, 4, drum section II is formed by a conical sheet metal member 5 which tapers towards the outlet end, i. e. towards end plate 6 and the weir 23 carried thereby.

For the purposes of the present invention the sheet metal member 5 is provided at its larger end with a plurality of circumferentially distributed discharge ports 20 serving the purpose of discharging the solid constituents deposited in the secondary drum section. The number and the total cross section of the ports 20 depend on the quantity of the material to be discharged. The discharged material will be collected in a hollow annular casting 22 closely surrounding the flange 40 and a similar flange provided on drum section II adjacent thereto and provided with the radial ports 20. Only a small fraction of the liquid entering the drum section II will be discharged through the ports 20. Most of it will overflow the weir 23 which is held in axial alignment by a shoulder 60 of the end wall 6.

The castings forming the collectors 17, 21 and 24 may be divided in a horizontal plane to permit the assembly thereof with the rotary drum and the end plates attached thereto.

Having described the rotary drum and the collecting means co-operating therewith, I shall now describe the rotary feeder.

On shaft 8 two hubs 9 and 11 are mounted, the hub 11 being keyed to the shaft, the hubs serving to support a hollow cylinder 14. More particularly, a flange 111 of hub member 11 has a shoulder 112 engaged by an internal flange 140 of the hollow cylinder 14. An internal peripheral projection 141 of the cylinder engages a peripheral recess 112' of flange 111.

The hub 9 carries an annular member 92 having a tapered outer face 93 and a flange 95 attached to the hub 9, a washer 91 being interposed therebetween. A ring 94 on shaft 8 serves to secure the hub 9 against axial displacement.

The left hand end of cylinder 14 engages over the periphery of the washer 91, whereas the right hand end has an internal flange 144 engaging a shoulder 121 provided in a flange 12 of the hub 11. The contacting flanges are suitably connected by screws, not shown. Pins 150, radially projecting from the cylinder 14 and inserted in holes 151 thereof, support a helical sheet metal strip 15 constituting a feeding worm engaging the internal face of the drum section I. A similar feed worm 16 engaging the internal wall of drum section II is supported by the cylinder 14 through radial pins, the width of the sheet metal strip constituting the worm 16 decreasing towards the outlet end, i. e. towards the end plate 6.

The annular member 92 is formed with outer radial ribs carrying a conical sheet metal member 13 surrounding the annular member 92 in spaced relationship and carrying outer short pins supporting the left helices of the feed form 15 within part 3 of drum section I. The liquid admitted into the drum through the end plate 1 and the member 100 will flow along member 13 through the space 10 and will thus be admitted to drum section I intermediate its ends.

The relative rotation of the drum and of the feed worm 15 carried by shaft 8 is so chosen with respect to the hand of the helical worm that the solid constituents deposited on the internal face of the rotary drum section I will be scraped off and fed towards the inlet end to be discharged through the apertures 2.

The embodiment illustrated in Fig. 2 is similarly differing from that shown in Fig. 1, however, by the structure of drum section I, same having intermediate its ends a larger diameter than near its ends, being composed of two conical subsections 3' and 4' abutting with their larger ends. The subsections 3', 4' of the drum are provided with flanges 300 and 400 which are suitably connected, for instance, by screws not shown, a shoulder 301 of one flange engaging over a supplemental shoulder 401 of the other flange.

Whereas in the embodiment shown in Fig. 1 the part 4 of drum section I is a continuous straight continuation of the part 3 up to the maximum cross section near the weir 19, in the embodiment shown in Fig. 2 the subsection 4' tapers towards the weir 19. As a result, the maximum cross section in the embodiment of Fig. 2 is positioned near a point intermediate the drum subsections 3' and 4' to be chosen so as to suit the requirements of any particular case.

The machine operates as follows: The mixture of solid matter and liquid to be separated is fed into the conical portion of the end wall 1 and will be accelerated therein. Thereupon the mixture is fed to the internal face of the conical member 13 on which it is further accelerated. Through the gap 10 the mixture will get into the drum section I forming an annular body therein having a cylindrical level, the diameter of such level being determined by the weir 19. By a suitable election of that diameter and of the rate of flow of the liquid through the drum and by a suitable shape of the drum subsections 3' and 4' and by properly choosing the liquid fed to the drum, the separating process may be so controlled in the section I as to meet the requirements of any particular case.

In the embodiment illustrated in Fig. 1 only such liquid will pass over the weir 19 as carries very finely divided solid matter, the coarser material having been separated in the drum section I. The balance of the solid material will be deposited in the drum section II. In the embodiment of Fig. 2, a comparatively large proportion of the solid matter will be carried by the liquid over the weir 19 and will then be deposited in the drum section II. In either embodiment purified liquid only will overflow the weir 23 attached to the end wall 6 at the outlet end. The functions of both embodiments differ by the concentration of the material discharged through the discharge ports 20.

The rotary feeder 15 will scrape the deposited solid matter from the internal face of the drum feeding same towards the tapering end of part 3 of the drum whence it will be discharged through the apertures 2 into the collector. As mentioned above, a larger or smaller proportion of the constituents of the solids settling at a lower rate will be carried by the liquid over the weir 19 into the drum section II, where the average radial depth of the annular body of liquid is so large and the axial component of the flow so small that the balance of the solid materials may settle to be then scraped off by the worm 16 and to be fed towards the discharge ports 20 in form of a thick paste, same being discharged into the collector 21.

The purified liquid will pass over the weir 23 and will be discharged through the ducts 7 and the collector 24. In order to preclude the liquid from being dammed back from drum section II into drum section I where such liquid would adversely affect the axial component of flow by increasing the radial depth of the body of liquid, the weir 23 is preferably given a larger internal diameter than the weir 19.

The discharge ports 20 are preferably constituted by exchangeable nozzles 210 inserted in suitable bores of drum section II, as illustrated in Fig. 3.

While in both embodiments the discharge ports 20 of drum section II are positioned close to the intermediate weir 19, they may be located otherwise, for instance near the outlet end. Worm 16 must be so constructed and operated as to feed the solids towards the discharge ports 20, no matter where same are located within drum section II.

From the foregoing description of two preferred embodiments it will appear that a characteristic of my invention is the subdivision of the drum in a primary section serving to separate solid matter having a higher settling rate and in a secondary drum section in which the solid matter having a lower settling rate will be separated, the secondary section being separated from the primary section by a weir over which the liquid flows when passing axially through the drum. The material to be treated will be subject to different conditions in the two drum sections in order to separately recover the solid matter, the different conditions depending on the different cross sections combined with a reduction of the level determined by the weirs and a different centrifugal influence. Hence, the present invention saves space and time in classifying the solid matter and in purifying the supporting liquid by means of the novel centrifugal separator. The operation prevents any injurious effect on the recovered solids as might happen where the supporting liquid is permitted to remain in contact with the solids for an extended period of time. Moreover, since the supporting liquid passes at full rotary speed from one drum section to the other, power will be saved which must be expended where a separate centrifugal separator is used to perform the work completed in drum section II of the novel separator. Moreover, it will appear from the description that the intermediate weir dividing the drum into the primary section and the secondary section has a higher damming level than the weir provided at the outlet end of the drum in a known manner. Owing to such arrangement an undesirable damming-back effect may be avoided.

By the provision of the nozzle ports provided in the angle between the intermediate weir and the drum section II in conjunction with the discharge of the solid matter through the worm contrary to the flow of direction of the liquid, the different solid matters may be selectively and separately recovered. The number of such nozzles and their cross section will depend on the quantity and the quality of the discharged material. The cross sections of the discharge ports may be varied by an exchange of the nozzle members 210.

While I have described two preferred embodiments of my invention, I wish it to be clearly understood that the same is not limited to the details of such embodiments but is capable of numerous modifications within the scope of the appended claims.

What I claim is:

1. Horizontal centrifugal separator comprising a rotary drum having inlet and outlet ends, inlet means mounted adjacent to the inlet end of said drum to feed a liquid to be treated into the latter, a collector mounted adjacent to the outlet end of said drum and adapted to collect and discharge the treated liquid issuing from said outlet end, helical strip conveyor means mounted for relative rotation within said drum substantially in contact with the inside thereof and adapted to axially feed deposits separated from said liquid in a direction towards said inlet end, means coordinated to said inlet end of said drum and adapted to collect the solids discharged therefrom by said conveyor means, and an annular internal weir extending from the inside of the drum wall intermediate the ends of the drum and spaced from said solids collecting means and sub-dividing the interior of said drum into a primary section and a secondary section, said weir having a smaller inner diameter than the adjacent drum wall on either side thereof, said primary section receiving the liquid to be treated from said inlet means and adapted to cause separation from said liquid of coarser solids, said secondary section being adapted to receive the liquid overflowing said weir and to separate the finer solids therefrom, said helical strip conveyor means comprising a primary conveyor wholly within said primary section and a separate secondary conveyor wholly within said secondary section, the latter section being provided with a plurality of discharge ports in the drum wall for said finer solids, said ports being positioned closely adjacent the annular internal weir.

2. Horizontal centrifugal separator as claimed in claim 1 in which the free sectional area of the first section of the drum just before the weir is smaller than the free sectional area of the secondary section of the drum just behind said weir.

3. Horizontal centrifugal separator as claimed in claim 1 in which said secondary section of said drum tapers inwardly towards said outlet ends of said drum.

4. Horizontal centrifugal separator as claimed in claim 1 in which said primary section of said drum tapers towards said inlet end of said drum and said secondary section of said drum tapers towards said outlet end of said drum.

5. Horizontal centrifugal separator as claimed in claim 1 in which the internal diameter of said primary section gradually increases towards said intermediate weir, whereas the internal diameter of said secondary section gradually decreases towards said outlet end.

6. Horizontal centrifugal separator as claimed in claim 1 in which said secondary feeder is adapted to feed the solids deposited in said secondary section of said drum towards said discharge ports provided in said secondary drum section.

7. The combination claimed in claim 1 in which said secondary drum section is provided with a second annular internal weir at said outlet end of said drum.

8. Horizontal centrifugal separator comprising a rotary drum having inlet and outlet ends, inlet means mounted adjacent to the inlet end of said drum to feed a liquid to be treated into the latter, a collector mounted adjacent to the outlet end of said drum and adapted to collect and discharge the treated liquid issuing from said outlet end, helical strip conveyor means mounted for relative rotation within said drum substantially in contact with the inside thereof and adapted to axially feed deposits separated from said liquid in a direction towards said inlet end, means coordinated to said inlet end of said drum and adapted to collect the solids discharged therefrom by said conveyor means, and an annular internal weir extending from the inside of the drum wall intermediate the ends of the drum and spaced from said solids collecting means and sub-dividing the interior of said drum into a primary section and a secondary section, said weir having a smaller inner diameter than the adjacent drum wall on either side thereof, said primary section receiving the liquid to be treated from said inlet means and being adapted to cause separation from said liquid of coarser solids, said secondary section being adapted to receive the liquid overflowing said weir and to separate the finer solids therefrom, said helical strip conveyor means comprising a primary conveyor wholly within said primary section and a separate secondary conveyor wholly within said secondary section the latter being provided with a plurality of discharge ports in the drum wall for said finer solids, said ports being positioned closely adjacent said internal weir, said drum sections being so dimensioned with respect to said weir that the annular body of liquid forming in said drum revolving at a high speed will have a larger average radial depth in said secondary section than it will have in said primary section of said drum.

9. Horizontal centrifugal separator as claimed in claim 8 in which said discharge ports are formed by nozzles mounted in the peripheral wall of said secondary drum section, a second collector surrounding said drum co-operating with said nozzles to collect the matter discharged therefrom.

10. Horizontal centrifugal separator as claimed in claim 8 in which said discharge ports are formed by nozzles exchangeably mounted in the peripheral wall of said secondary drum section, a second collector surrounding said drum co-operating with said nozzles to collect the matter discharged therefrom.

11. Horizontal centrifugal separator comprising a rotary drum having inlet and outlet ends, inlet means mounted adjacent to the inlet end of said drum to feed a liquid to be treated into the latter, a collector mounted adjacent to the outlet end of said drum and adapted to collect and discharge the treated liquid issuing from said outlet end, helical strip conveyor means mounted for relative rotation within said drum substantially in contact with the inside thereof and adapted to axially feed deposits separated from said liquid in a direction towards said inlet end, means coordinated to said inlet end of said drum and adapted to collect the solids discharged therefrom by said conveyor means, a primary annular internal weir extending from the inside of the drum wall intermediate the ends of the drum and spaced from said solids collecting means and sub-dividing the interior of said drum into a primary section and a secondary section, said weir having a smaller inner diameter than the adjacent drum wall on either side thereof, said primary section receiving the liquid to be treated from said inlet means and being adapted to cause separation from said liquid of coarser solids, said secondary section being adapted to receive the liquid overflowing said weir and to separate the finer solids therefrom, said helical strip conveyor means comprising a primary conveyor wholly within said primary section and a separate secondary conveyor wholly within said secondary section, the latter being provided with a plurality of discharge ports in the drum wall for said finer solids, said ports being positioned closely adjacent said internal weir, and a secondary annular internal weir provided in said secondary drum section at said outlet end, the radial distance of the overflow edge of said primary weir from the adjacent wall of said primary section being larger than the distance of the overflow edge of said secondary weir from the adjacent wall of said secondary section.

References Cited in the file of this patent

UNITED STATES PATENTS

| | | |
|---|---|---|
| 1,710,316 | Laughlin | Apr. 23, 1929 |
| 2,528,974 | Ritsch | Nov. 7, 1950 |

FOREIGN PATENTS

| | | |
|---|---|---|
| 65,799 | Norway | Feb. 15, 1943 |
| 469,308 | Great Britain | July 22, 1937 |
| 661,668 | Germany | June 23, 1938 |